United States Patent
Shih

(10) Patent No.: US 9,904,039 B2
(45) Date of Patent: Feb. 27, 2018

(54) NEAR INFRARED LENS ASSEMBLY

(71) Applicants: Sintai Optical (Shenzhen) Co., Ltd., Shenzhen, Guandong Province (CN); Asia Optical International Ltd., Tortola (GB)

(72) Inventor: Po-Yuan Shih, Taichung (TW)

(73) Assignees: SINTAI OPTICAL (SHENZHEN) CO., LTD., Shenzhen, Guangdong Province (CN); ASIA OPTICAL INTERNATIONAL LTD., Tortola (VG)

( * ) Notice: Subject to any disclaimer, the term of this patent is extended or adjusted under 35 U.S.C. 154(b) by 175 days.

(21) Appl. No.: 14/568,236

(22) Filed: Dec. 12, 2014

(65) Prior Publication Data

US 2015/0168680 A1 Jun. 18, 2015

(30) Foreign Application Priority Data

Dec. 16, 2013 (TW) ................... 102146333 A

(51) Int. Cl.
G02B 13/00 (2006.01)
G02B 9/34 (2006.01)

(52) U.S. Cl.
CPC ............ *G02B 13/008* (2013.01); *G02B 9/34* (2013.01); *G02B 13/004* (2013.01)

(58) Field of Classification Search
CPC ............ G02B 13/004; G02B 13/0045; G02B 13/008; G02B 9/34; G02B 9/60; G02B 9/62; G02B 9/64
See application file for complete search history.

(56) References Cited

U.S. PATENT DOCUMENTS

| 5,900,994 | A | * | 5/1999 | Otomo | ............. G02B 9/34 359/773 |
| 2010/0110562 | A1 | * | 5/2010 | Aoi | ............. G02B 13/0035 359/715 |
| 2010/0302653 | A1 | * | 12/2010 | Liang | ............. G02B 13/18 359/715 |
| 2017/0003484 | A1 | * | 1/2017 | Kubota | ............. G02B 13/0015 |

FOREIGN PATENT DOCUMENTS

TW M347577 12/2008

* cited by examiner

*Primary Examiner* — Stephone B Allen
*Assistant Examiner* — Adam W Booher
(74) *Attorney, Agent, or Firm* — McClure, Qualey & Rodack, LLP

(57) ABSTRACT

A near infrared lens assembly includes a first lens, a second lens, a third lens and a fourth lens, all of which are arranged in sequence from an object side to an image side along an optical axis. The first lens is with positive refractive power and includes a convex surface facing the object side. The second lens is a meniscus lens and includes a convex surface facing the object side and a concave surface facing the image side. The third lens is a meniscus lens and includes a concave surface facing the object side and a convex surface facing the image side. The fourth lens is with negative refractive power and includes a concave surface facing the object side.

16 Claims, 20 Drawing Sheets

NEAR INFRARED LENS ASSEMBLY

BACKGROUND OF THE INVENTION

Field of the Invention

The invention relates to a near infrared lens assembly.

Description of the Related Art

Some of the game consoles or smart TVs are provided with a non-contact control function. Therefore, users do not need to use a traditional key or remote control but to move their limbs to control the game consoles or smart TVs. A device with such a non-contact control function usually has an image capture lens to capture the images of movement of user's limbs as a basis for controlling the device. However, because of the lightweight and thinness demand for the described devices, the image capture lenses disposed therein are necessarily lightweight and thin.

BRIEF SUMMARY OF THE INVENTION

The invention provides a near infrared lens assembly to solve the above problems. The near infrared lens assembly of the invention, provided with characteristics of a shortened total lens length, is lightweight and thin and has a good optical performance and resolution.

The near infrared lens assembly in accordance with an exemplary embodiment of the invention includes a first lens, a second lens, a third lens and a fourth lens, all of which are arranged in sequence from an object side to an image side along an optical axis. The first lens is with positive refractive power and includes a convex surface facing the object side. The second lens is a meniscus lens and includes a convex surface facing the object side and a concave surface facing the image side. The third lens is a meniscus lens and includes a concave surface facing the object side and a convex surface facing the image side. The fourth lens is with negative refractive power and includes a concave surface facing the object side.

The near infrared lens assembly in accordance with another exemplary embodiment of the invention includes a first lens, a second lens, a third lens and a fourth lens, all of which are arranged in sequence from an object side to an image side along an optical axis. The first lens is with positive refractive power. The second lens is a meniscus lens and includes a convex surface facing the object side and a concave surface facing the image side. The third lens is a meniscus lens and includes a concave surface facing the object side and a convex surface facing the image side. The fourth lens is with negative refractive power. The near infrared lens assembly satisfies:

$0.5 \leq f_1/f \leq 3$, $-5 \leq f_2/f \leq 2$, $-5 \leq f_3/f \leq 5$, and $-2 \leq f_4/f \leq -0.5$, wherein $f_1$ is an effective focal length of the first lens, $f_2$ is an effective focal length of the second lens, $f_3$ is an effective focal length of the third lens, $f_4$ is an effective focal length of the fourth lens and f is an effective focal length of the near infrared lens assembly.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
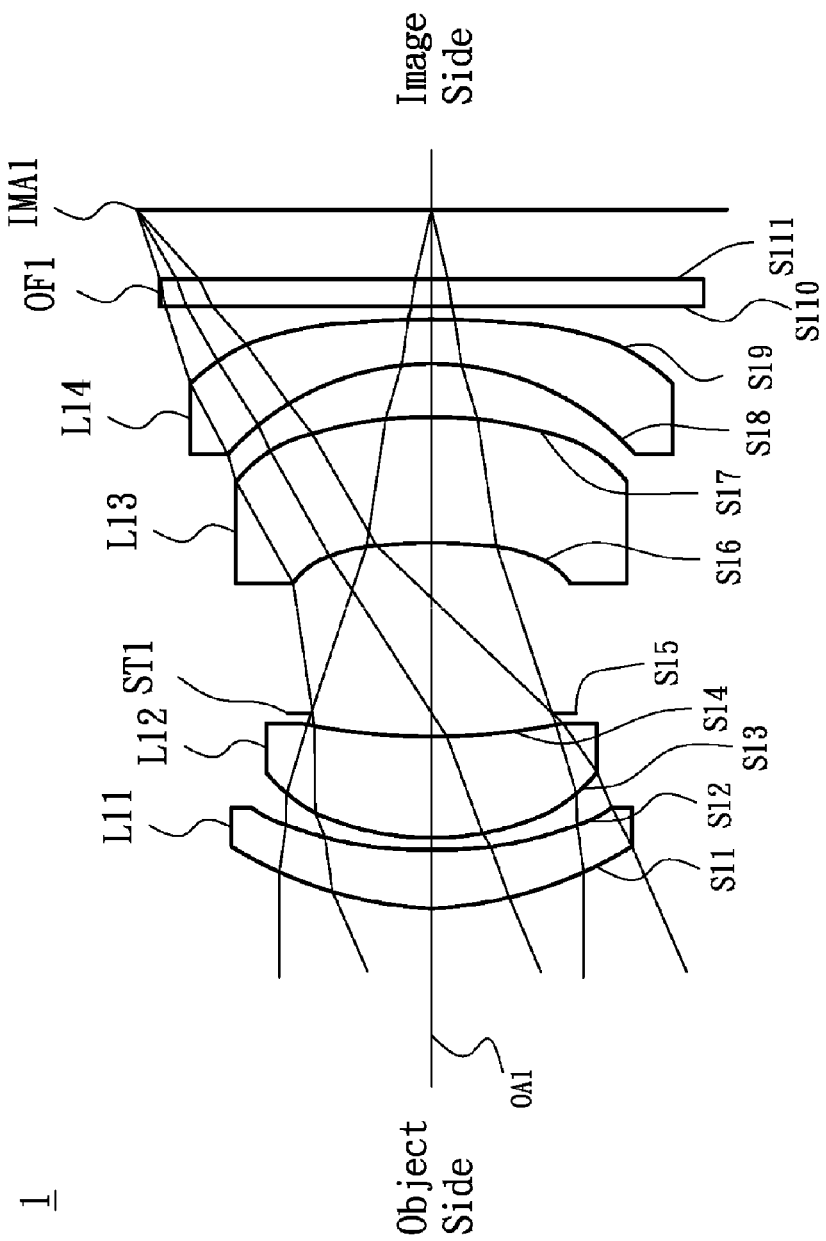
FIG. 1 is a lens layout and optical path diagram of a near infrared lens assembly in accordance with a first embodiment of the invention.

Referring to FIG. 1, FIG. 1 is a lens layout and optical path diagram of a near infrared lens assembly in accordance with a first embodiment of the invention. The near infrared lens assembly 1 includes a first lens L11, a second lens L12, a stop ST1, a third lens L13, a fourth lens L14 and an Optical filter OF1, all of which are arranged in sequence from an object side to an image side along an optical axis OA1. In operation, an image of light rays from the object side is formed at an image plane IMA1. The first lens L11 is made of plastic material and with positive refractive power, wherein the object side surface S11 is a convex surface, the image side surface S12 is a concave surface and both of the object side surface S11 and image side surface S12 are aspheric surfaces. The second lens L12 is made of plastic material and with positive refractive power, wherein the object side surface S13 is a convex surface, the image side surface S14 is a concave surface and both of the object side surface S13 and image side surface S14 are aspheric surfaces. The third lens L13 is made of plastic material and with positive refractive power, wherein the object side surface S16 is a concave surface, the image side surface S17 is a convex surface and both of the object side surface S16 and image side surface S17 are aspheric surfaces. The fourth lens L14 is made of plastic material and with negative refractive power, wherein the object side surface S18 is a concave surface, the image side surface S19 is a convex surface and both of the object side surface S18 and image side surface S19 are aspheric surfaces. Both of the object side surface S110 and image side surface S111 of the optical filter OF1 are plane surfaces.

In order to maintain excellent optical performance of the near infrared lens assembly in accordance with the first embodiment of the invention, the near infrared lens assembly 1 must satisfies the following seven conditions:

$$0.6 \leq fl_{12}/fl \leq 1 \quad (1)$$

$$-2 \leq fl_{34}/fl \leq -0.5 \quad (2)$$

$$0.9 \leq fl/TTL1 \leq 1 \quad (3)$$

$$0.5 \leq fl_1/fl \leq 3 \quad (4)$$

$$-5 \leq fl_2/fl \leq 2 \quad (5)$$

$$-5 \leq fl_3/fl \leq 5 \quad (6)$$

$$-2 \leq fl_4/fl \leq -0.5 \quad (7)$$

wherein $fl_{12}$ is an effective focal length of the combination of the first lens L11 and the second lens L12, $fl_{34}$ is an effective focal length of the combination of the third lens L13 and the fourth lens L14, $fl$ is an effective focal length of the near infrared lens assembly 1, TTL1 is a distance from the object side surface S11 of the first lens L11 to the image plane IMA1 along the optical axis OA1, $fl_1$ is an effective focal length of the first lens L11, $fl_2$ is an effective focal length of the second lens L12, $fl_3$ is an effective focal length of the third lens L13, and $fl_4$ is an effective focal length of the fourth lens L14.

By the above design of the lenses and stop ST1, the near infrared lens assembly 1 is provided with a shortened total lens length, an increased resolution, and an effective corrected aberration.

In order to achieve the above purposes and effectively enhance the optical performance, the near infrared lens assembly 1 in accordance with the first embodiment of the invention is provided with the optical specifications shown in Table 1, which include the effective focal length, F-number, field of view, total lens length, radius of curvature of each lens surface, thickness between adjacent surface, refractive index of each lens and Abbe number of each lens. Table 1 shows that the effective focal length is equal to 5.093 mm, F-number is equal to 2.2, field of view is equal to 94° and total lens length is equal to 5.4000 mm for the near infrared lens assembly 1 of the first embodiment of the invention.

TABLE 1

Effective Focal Length = 5.093 mm F-number = 2.2
Field of View = 94° Total Lens Length = 5.400 mm

| Surface Number | Radius of Curvature (mm) | Thickness (mm) | Nd | Vd | Remark |
|---|---|---|---|---|---|
| S11 | 2.30411 | 0.447 | 1.535 | 56.1 | The First Lens L11 |
| S12 | 3.58473 | 0.093 | | | |
| S13 | 2.45814 | 0.784 | 1.589 | 61.2 | The Second Lens L12 |
| S14 | 6.84903 | 0.180 | | | |
| S15 | ∞ | 1.317 | | | Stop ST1 |
| S16 | −4.94095 | 0.972 | 1.636 | 23.9 | The Third Lens L13 |
| S17 | −3.80651 | 0.424 | | | |
| S18 | −1.76386 | 0.333 | 1.535 | 56.1 | The Fourth Lens L14 |
| S19 | −7.00000 | 0.100 | | | |
| S110 | ∞ | 0.210 | 1.517 | 64.2 | Optical Filter OF1 |
| S111 | ∞ | 0.540 | | | |

The aspheric surface sag z of each lens in table 1 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the first embodiment, the conic constant k and the aspheric coefficients A, B, C, D, E of each surface are shown in Table 2.

TABLE 2

| Surface Number | k | A | B | C | D | E |
|---|---|---|---|---|---|---|
| S11 | −1.99783E+00 | 5.61679E−04 | −4.46319E−03 | 7.09092E−04 | 5.14565E−04 | −3.13089E−06 |
| S12 | 0.00000E+00 | 2.51396E−03 | 2.63154E−03 | −2.30230E−04 | 1.07719E−04 | 4.45165E−04 |

TABLE 2-continued

| Surface Number | k | A | B | C | D | E |
|---|---|---|---|---|---|---|
| S13 | 2.06045E+00 | 1.49677E−02 | 4.50403E−03 | −1.20280E−03 | −1.64943E−03 | 8.52250E−04 |
| S14 | 0.00000E+00 | 1.55519E−02 | 6.00661E−03 | −2.88119E−04 | −8.93666E−04 | 4.43272E−03 |
| S16 | 1.81205E+01 | −5.44221E−02 | −1.22054E−02 | −4.25276E−02 | 4.54063E−02 | −3.43335E−02 |
| S17 | −2.63890E+00 | −5.85360E−03 | −1.35120E−02 | 3.38004E−04 | −2.28701E−03 | 7.44277E−04 |
| S18 | 0.00000E+00 | 7.49660E−02 | −2.17620E−02 | −1.95723E−03 | 1.03275E−03 | 4.16999E−04 |
| S19 | 0.00000E+00 | 1.56278E−02 | −1.73922E−02 | 7.07543E−04 | 8.37928E−04 | −1.36094E−04 |

For the near infrared lens assembly 1 of the first embodiment, the effective focal length $fl_{12}$ of the combination of the first lens L11 and the second lens L12 is equal to 4.0866215 mm, the effective focal length $fl_{34}$ of the combination of the third lens L13 and the fourth lens L14 is equal to −5.488787 mm, the effective focal length f1 of the near infrared lens assembly 1 is equal to 5.093 mm, the distance TTL1 from the object side surface S11 of the first lens L11 to the image plane IMA1 along the optical axis OA1 is equal to 5.400 mm, the effective focal length $fl_1$ of the first lens L11 is equal to 10.918827 mm, the effective focal length $fl_2$ of the second lens L12 is equal to 6.194119 mm, the effective focal length $fl_3$ of the third lens L13 is equal to 20.378295 mm, and the effective focal length $fl_4$ of the fourth lens L14 is equal to −4.573391 mm. According to the above data, the following values can be obtained:

$$fl_{12}/fl=0.8024,$$

$$fl_{34}/fl=-1.0777,$$

$$fl/TTL1=0.9432,$$

$$fl_1/fl=2.1439,$$

$$fl_2/fl=1.2162,$$

$$fl_3/fl=4.0012,$$

$$fl_4/fl=-0.8980$$

which respectively satisfy the above conditions (1)-(7).

Figure 2A:
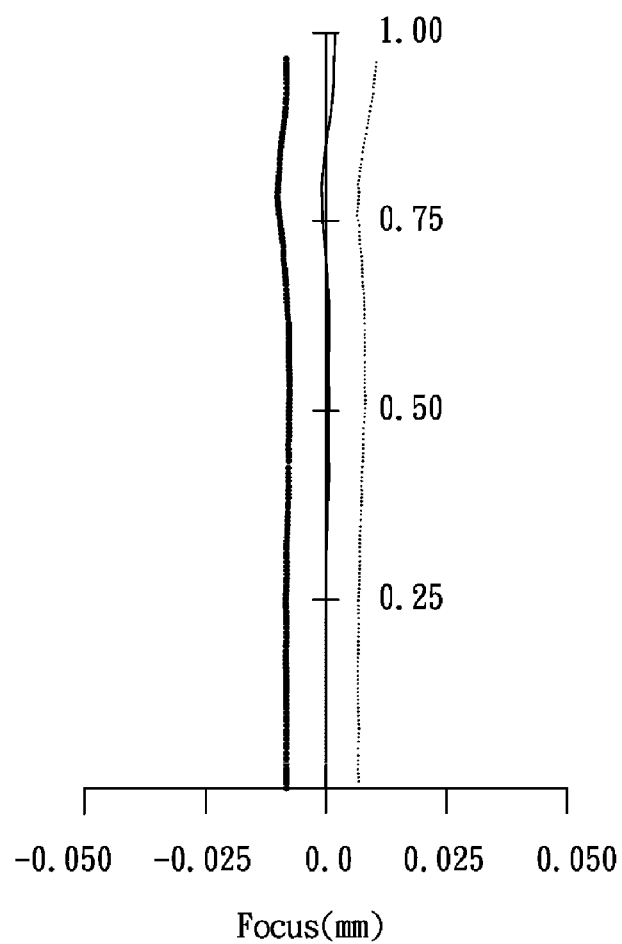
FIG. 2A depicts a longitudinal spherical aberration of the near infrared lens assembly in accordance with the first embodiment of the invention.
Figure 2B:
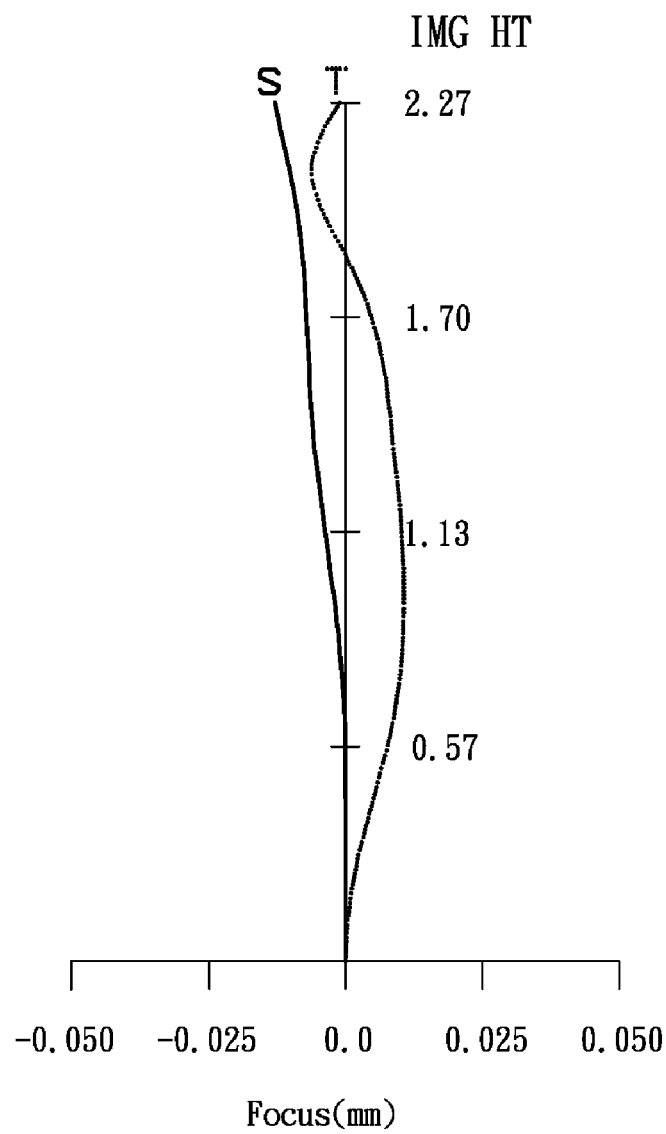
FIG. 2B is an astigmatic field curves diagram of the near infrared lens assembly in accordance with the first embodiment of the invention.
Figure 2C:
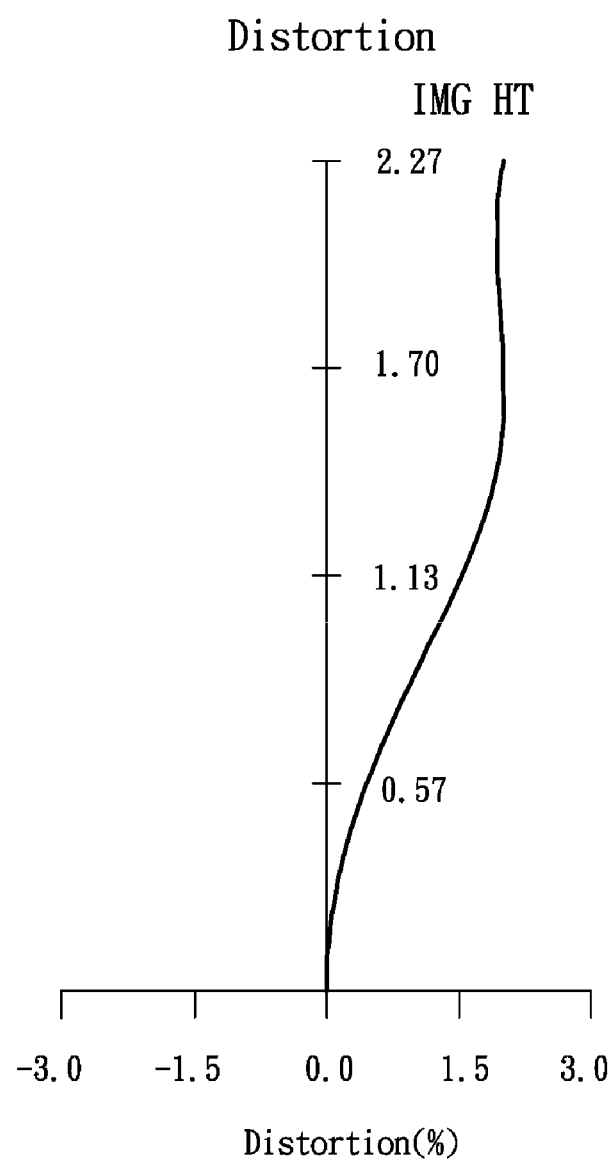
FIG. 2C is a distortion diagram of the near infrared lens assembly in accordance with the first embodiment of the invention.

By the above arrangements of the lenses and stop ST1, the near infrared lens assembly 1 of the first embodiment can meet the requirements of optical performance as seen in FIGS. 2A-2C, wherein FIG. 2A shows a longitudinal spherical aberration diagram of the near infrared lens assembly 1 in accordance with the first embodiment of the invention, FIG. 2B shows an astigmatic field curves of the near infrared lens assembly 1 in accordance with the first embodiment of the invention and FIG. 2C shows a distortion diagram of the near infrared lens assembly 1 in accordance with the first embodiment of the invention.

It can be seen from FIG. 2A that the longitudinal spherical aberration in the near infrared lens assembly 1 of the first embodiment ranges between −0.0125 mm and 0.0125 mm for the wavelength of 800.0000 nm, 850.0000 nm and 900.0000 nm. It can be seen from FIG. 2B that the astigmatic field curves of tangential direction and sagittal direction in the near infrared lens assembly 1 of the first embodiment ranges between −0.0125 mm and 0.0125 mm for the wavelength of 850.0000 nm. It can be seen from FIG. 2C that the distortion in the near infrared lens assembly 1 of the first embodiment ranges between 0% and 2.0% for the wavelength of 850.0000 nm. It is obvious that the longitudinal spherical aberration, the astigmatic field curves and the distortion of the near infrared lens assembly 1 of the first embodiment can be corrected effectively. Therefore, the near infrared lens assembly 1 of the first embodiment is capable of good optical performance.

Figure 3:
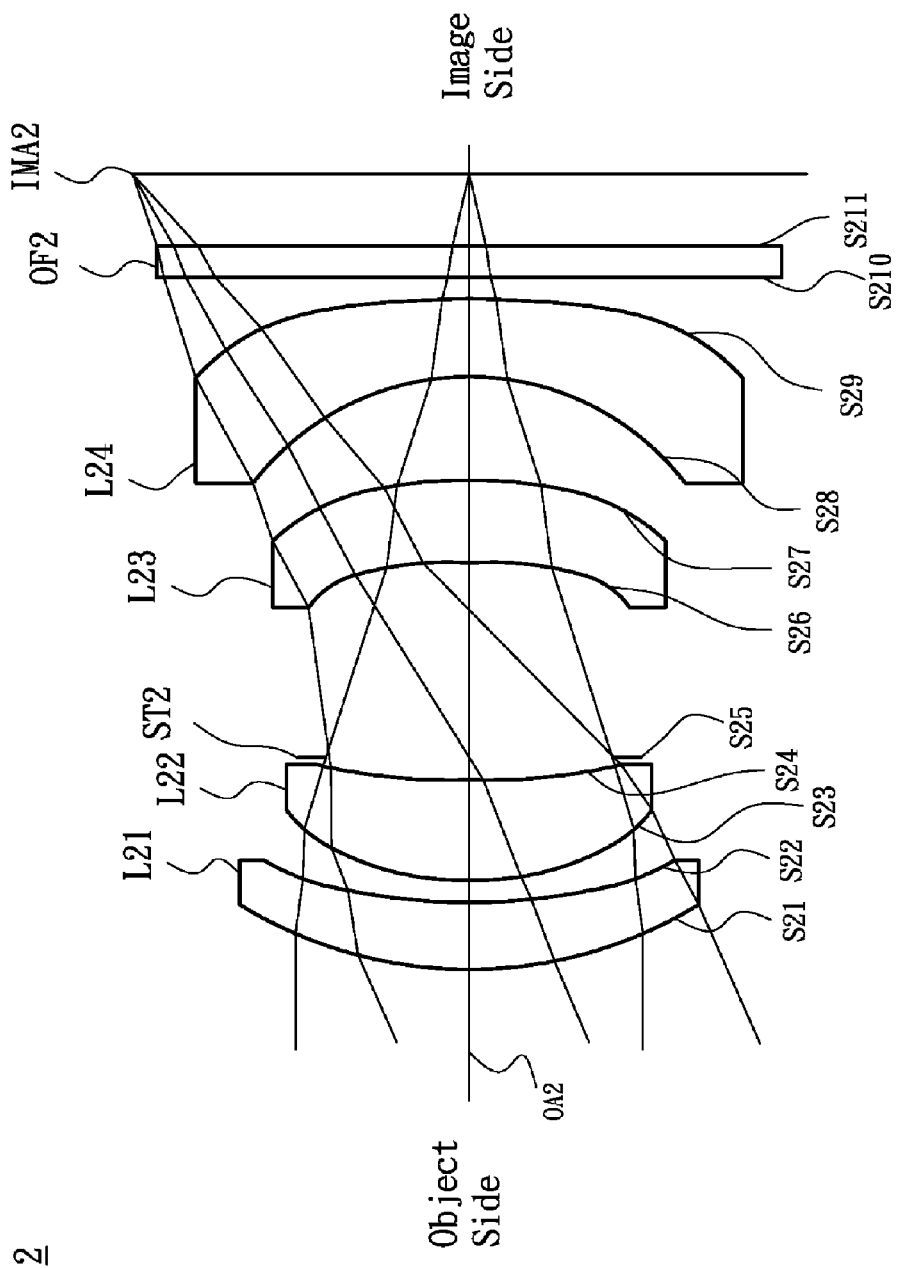
FIG. 3 is a lens layout and optical path diagram of a near infrared lens assembly in accordance with a second embodiment of the invention.

Referring to FIG. 3, FIG. 3 is a lens layout and optical path diagram of a near infrared lens assembly in accordance with a second embodiment of the invention. The near infrared lens assembly 2 includes a first lens L21, a second lens L22, a stop ST2, a third lens L23, a fourth lens L24 and an Optical filter OF2, all of which are arranged in sequence from an object side to an image side along an optical axis OA2. In operation, an image of light rays from the object side is formed at an image plane IMA2. The first lens L21 is made of plastic material and with positive refractive power, wherein the object side surface S21 is a convex surface, the image side surface S22 is a concave surface and both of the object side surface S21 and image side surface S22 are aspheric surfaces. The second lens L22 is made of plastic material and with positive refractive power, wherein the object side surface S23 is a convex surface, the image side surface S24 is a concave surface and both of the object side surface S23 and image side surface S24 are aspheric surfaces. The third lens L23 is made of plastic material and with positive refractive power, wherein the object side surface S26 is a concave surface, the image side surface S27 is a convex surface and both of the object side surface S26 and image side surface S27 are aspheric surfaces. The fourth lens L24 is made of plastic material and with negative refractive power, wherein the object side surface S28 is a concave surface, the image side surface S29 is a convex surface and both of the object side surface S28 and image side surface S29 are aspheric surfaces. Both of the object side surface S210 and image side surface S211 of the optical filter OF2 are plane surfaces.

In order to maintain excellent optical performance of the near infrared lens assembly in accordance with the second embodiment of the invention, the near infrared lens assembly 2 must satisfies the following seven conditions:

$$0.6 \leq f2_{12}/f2 \leq 1 \quad (8)$$

$$-2 \leq f2_{34}/f2 \leq -0.5 \quad (9)$$

$$0.9 \leq f2/TTL2 \leq 1 \quad (10)$$

$$0.5 \leq f2_1/f2 \leq 3 \quad (11)$$

$$-5 \leq f2_2/f2 \leq 2 \quad (12)$$

$$-5 \leq f2_3/f2 \leq 5 \quad (13)$$

$$-2 \leq f2_4/f2 \leq -0.5 \quad (14)$$

wherein $f2_{12}$ is an effective focal length of the combination of the first lens L21 and the second lens L22, $f2_{34}$ is an effective focal length of the combination of the third lens L23 and the fourth lens L24, f2 is an effective focal length of the near infrared lens assembly 2, TTL2 is a distance from the object side surface S21 of the first lens L21 to the image plane IMA2 along the optical axis OA2, $f2_1$ is an effective focal length of the first lens L21, $f2_2$ is an effective focal length of the second lens L22, $f2_3$ is an effective focal length of the third lens L23, and $f2_4$ is an effective focal length of the fourth lens L24.

By the above design of the lenses and stop ST2, the near infrared lens assembly 2 is provided with a shortened total lens length, an increased resolution, and an effective corrected aberration.

In order to achieve the above purposes and effectively enhance the optical performance, the near infrared lens assembly 2 in accordance with the second embodiment of the invention is provided with the optical specifications shown in Table 3, which include the effective focal length, F-number, field of view, total lens length, radius of curvature of each lens surface, thickness between adjacent surface, refractive index of each lens and Abbe number of each lens. Table 3 shows that the effective focal length is equal to 5.083 mm, F-number is equal to 2.2, field of view is equal to 94° and total lens length is equal to 5.4000 mm for the near infrared lens assembly 2 of the second embodiment of the invention.

TABLE 3

Effective Focal Length = 5.083 mm F-number = 2.2
Field of View = 94° Total Lens Length = 5.400 mm

| Surface Number | Radius of Curvature (mm) | Thickness (mm) | Nd | Vd | Remark |
|---|---|---|---|---|---|
| S21 | 2.53234 | 0.460 | 1.535 | 56.1 | The First Lens L21 |
| S22 | 4.16824 | 0.150 | | | |
| S23 | 2.39625 | 0.680 | 1.535 | 56.1 | The Second Lens L22 |
| S24 | 7.00000 | 0.153 | | | |
| S25 | ∞ | 1.320 | | | Stop ST2 |
| S26 | −5.67375 | 0.559 | 1.636 | 23.9 | The Third Lens L23 |
| S27 | −3.45220 | 0.699 | | | |
| S28 | −1.63948 | 0.528 | 1.535 | 56.1 | The Fourth Lens L24 |
| S29 | −7.00000 | 0.150 | | | |
| S210 | ∞ | 0.210 | 1.517 | 64.2 | Optical Filter OF2 |
| S211 | ∞ | 0.490 | | | |

The aspheric surface sag z of each lens in table 3 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the second embodiment, the conic constant k and the aspheric coefficients A, B, C, D, E of each surface are shown in Table 4.

tion of the first lens L21 and the second lens L22 is equal to 4.289673 mm, the effective focal length $f2_{34}$ of the combination of the third lens L23 and the fourth lens L24 is equal to −6.257359 mm, the effective focal length f2 of the near infrared lens assembly 2 is equal to 5.083 mm, the distance TTL2 from the object side surface S21 of the first lens L21 to the image plane IMA2 along the optical axis OA2 is equal to 5.400 mm, the effective focal length $f2_1$ of the first lens L21 is equal to 11.155635 mm, the effective focal length $f2_2$ of the second lens L22 is equal to 6.576252 mm, the effective focal length $f2_3$ of the third lens L23 is equal to 13.111489 mm, and the effective focal length $f2_4$ of the fourth lens L24 is equal to −4.204105 mm. According to the above data, the following values can be obtained:

$f2_{12}/f2 = 0.8439$, $f2_{34}/f2 = -1.2311$, $f2/TTL2 = 0.9414$, $f2_1/f2 = 2.1947$, $f2_2/f2 = 1.2938$, $f2_3/f2 = 2.5795$, $f2_4/f2 = -0.8271$ which respectively satisfy the above conditions (8)-(14).

Figure 4A:
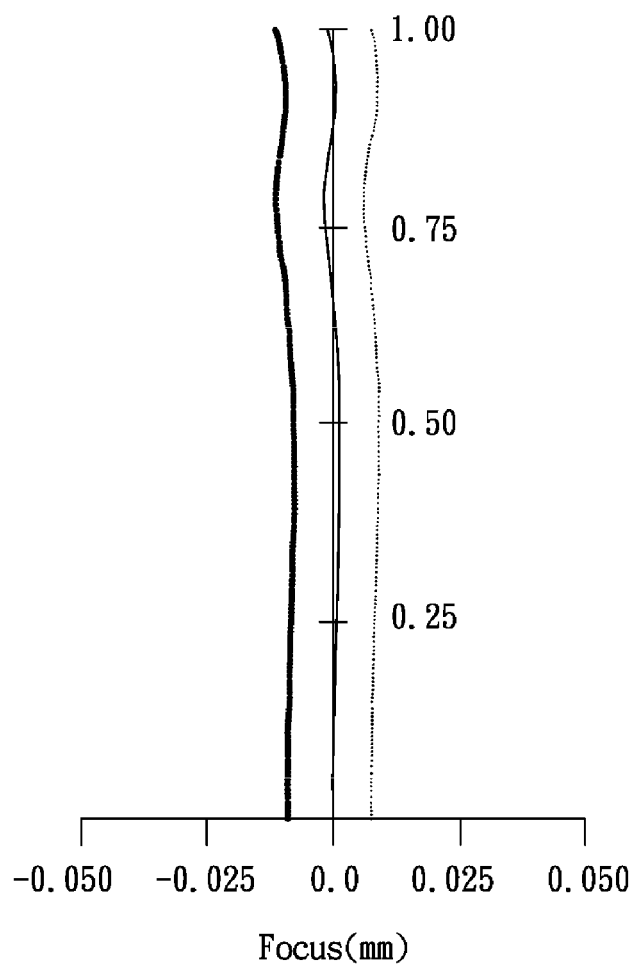
FIG. 4A depicts a longitudinal spherical aberration of the near infrared lens assembly in accordance with the second embodiment of the invention.
Figure 4B:
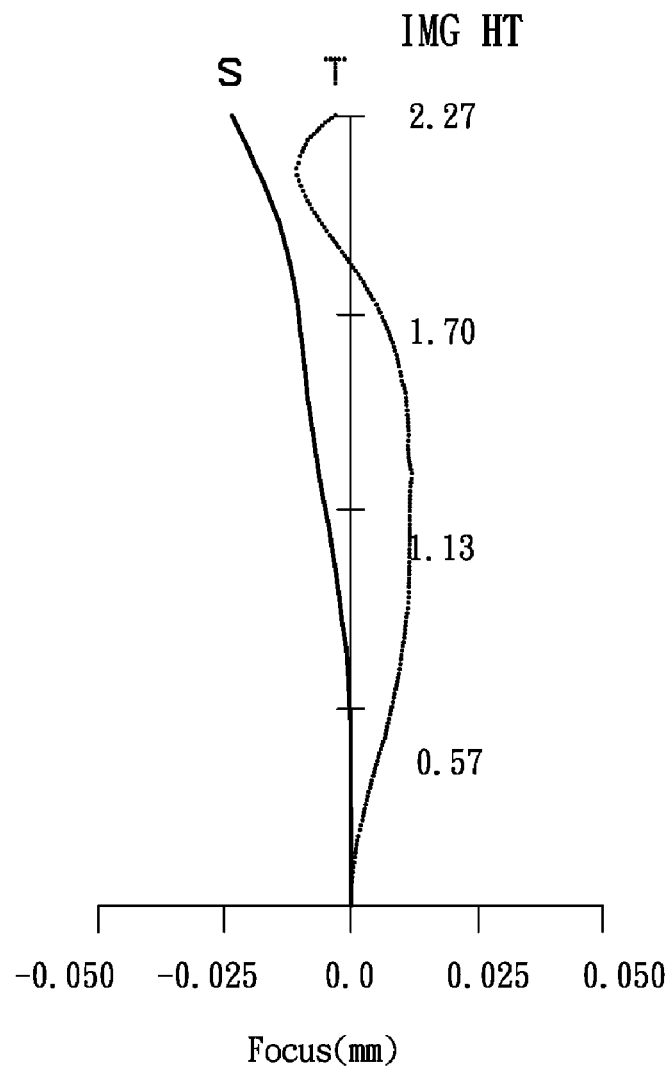
FIG. 4B is an astigmatic field curves diagram of the near infrared lens assembly in accordance with the second embodiment of the invention.
Figure 4C:
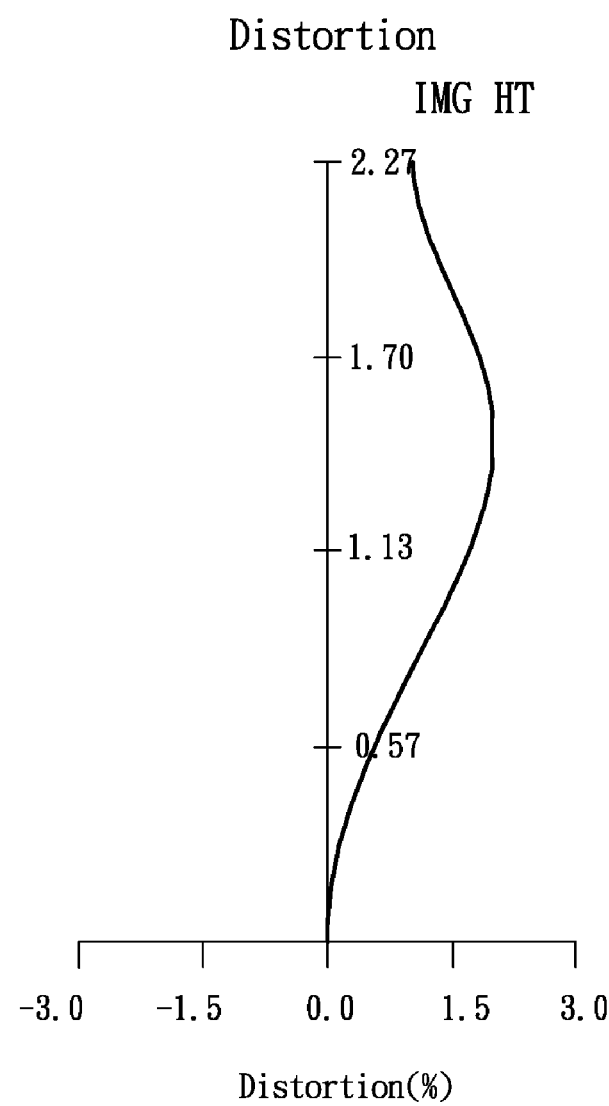
FIG. 4C is a distortion diagram of the near infrared lens assembly in accordance with the second embodiment of the invention.

By the above arrangements of the lenses and stop ST2, the near infrared lens assembly 2 of the second embodiment can meet the requirements of optical performance as seen in FIGS. 4A-4C, wherein FIG. 4A shows a longitudinal spherical aberration diagram of the near infrared lens assembly 2 in accordance with the second embodiment of the invention, FIG. 4B shows an astigmatic field curves of the near infrared lens assembly 2 in accordance with the second embodiment of the invention and FIG. 4C shows a distortion diagram of the near infrared lens assembly 2 in accordance with the second embodiment of the invention.

It can be seen from FIG. 4A that the longitudinal spherical aberration in the near infrared lens assembly 2 of the second embodiment ranges between −0.0125 mm and 0.0125 mm for the wavelength of 800.0000 nm, 850.0000 nm and 900.0000 nm. It can be seen from FIG. 4B that the astigmatic field curves of tangential direction and sagittal direction in the near infrared lens assembly 2 of the second embodiment ranges between −0.025 mm and 0.0125 mm for the wavelength of 850.0000 nm. It can be seen from FIG. 4C that the distortion in the near infrared lens assembly 2 of the second embodiment ranges between 0% and 2.0% for the wavelength of 850.0000 nm. It is obvious that the longitudinal

TABLE 4

| Surface Number | k | A | B | C | D | E |
|---|---|---|---|---|---|---|
| S21 | −2.49760E+00 | −2.45659E−04 | −3.14267E−03 | 8.31292E−04 | 4.52105E−04 | 2.91430E−05 |
| S22 | 0.00000E+00 | 1.20352E−03 | 1.94359E−03 | −9.32779E−05 | 3.49476E−04 | 4.76111E−04 |
| S23 | 2.04636E+00 | 1.69894E−02 | 2.33948E−03 | −2.04039E−03 | −1.71241E−03 | 1.09559E−03 |
| S24 | 0.00000E+00 | 1.73167E−02 | 5.05259E−03 | −2.31223E−03 | −5.65035E−04 | 4.17727E−03 |
| S26 | 2.37031E+01 | −4.34663E−02 | −2.31927E−02 | −2.72808E−02 | 2.19635E−02 | −1.86886E−02 |
| S27 | −1.10801E+00 | −1.19873E−02 | −1.97693E−02 | −2.15195E−03 | −3.61622E−03 | 2.28346E−03 |
| S28 | 0.00000E+00 | 4.93839E−02 | −1.09203E−02 | −9.06458E−03 | 3.24130E−03 | 1.03739E−03 |
| S29 | 0.00000E+00 | 1.18861E−02 | −1.77139E−02 | 1.93381E−03 | 1.24811E−04 | −2.69907E−05 |

For the near infrared lens assembly 2 of the second embodiment, the effective focal length $f2_{12}$ of the combinaspherical aberration, the astigmatic field curves and the distortion of the near infrared lens assembly 2 of the second embodiment can be corrected effectively. Therefore, the near infrared lens assembly 2 of the second embodiment is capable of good optical performance.

Figure 5:
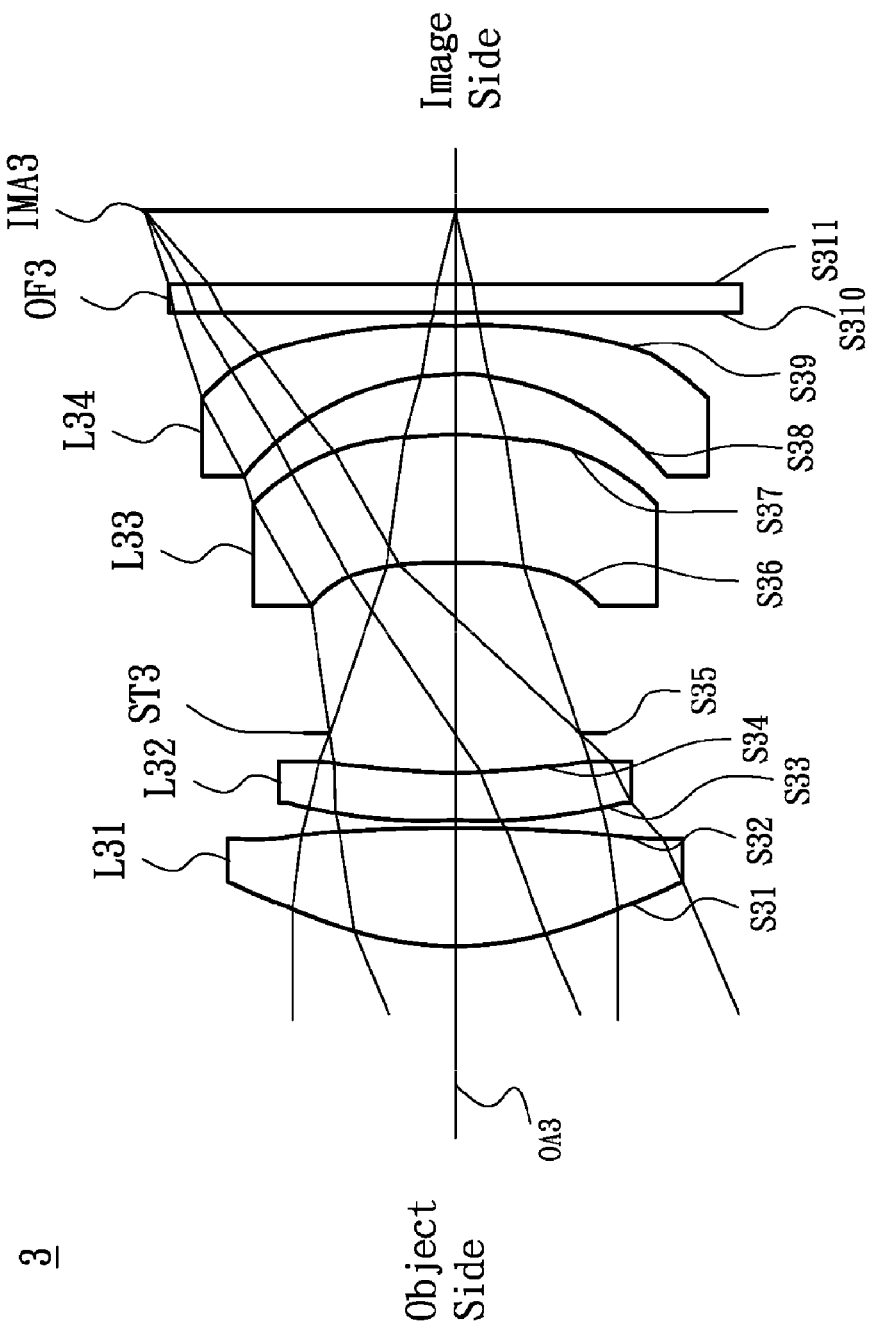
FIG. 5 is a lens layout and optical path diagram of a near infrared lens assembly in accordance with a third embodiment of the invention.

Referring to FIG. 5, FIG. 5 is a lens layout and optical path diagram of a near infrared lens assembly in accordance with a third embodiment of the invention. The near infrared lens assembly 3 includes a first lens L31, a second lens L32, a stop ST3, a third lens L33, a fourth lens L34 and an Optical filter OF3, all of which are arranged in sequence from an object side to an image side along an optical axis OA3. In operation, an image of light rays from the object side is formed at an image plane IMA3. The first lens L31 is made of plastic material and with positive refractive power, wherein the object side surface S31 is a convex surface, the image side surface S32 is a convex surface and both of the object side surface S31 and image side surface S32 are aspheric surfaces. The second lens L32 is made of plastic material and with negative refractive power, wherein the object side surface S33 is a convex surface, the image side surface S34 is a concave surface and both of the object side surface S33 and image side surface S34 are aspheric surfaces. The third lens L33 is made of plastic material and with positive refractive power, wherein the object side surface S36 is a concave surface, the image side surface S37 is a convex surface and both of the object side surface S36 and image side surface S37 are aspheric surfaces. The fourth lens L34 is made of plastic material and with negative refractive power, wherein the object side surface S38 is a concave surface, the image side surface S39 is a convex surface and both of the object side surface S38 and image side surface S39 are aspheric surfaces. Both of the object side surface S310 and image side surface S311 of the optical filter OF3 are plane surfaces.

In order to maintain excellent optical performance of the near infrared lens assembly in accordance with the third embodiment of the invention, the near infrared lens assembly 3 must satisfies the following seven conditions:

$$0.6 \leq f3_{12}/f3 \leq 1 \quad (15)$$

$$-2 \leq f3_{34}/f3 \leq -0.5 \quad (16)$$

$$0.9 \leq f3/TTL3 \leq 1 \quad (17)$$

$$0.5 \leq f3_1/f3 \leq 3 \quad (18)$$

$$-5 \leq f3_2/f3 \leq 2 \quad (19)$$

$$-5 \leq f3_3/f3 \leq 5 \quad (20)$$

$$-2 \leq f3_4/f3 \leq -0.5 \quad (21)$$

wherein $f3_{12}$ is an effective focal length of the combination of the first lens L31 and the second lens L32, $f3_{34}$ is an effective focal length of the combination of the third lens L33 and the fourth lens L34, $f3$ is an effective focal length of the near infrared lens assembly 3, TTL3 is a distance from the object side surface S31 of the first lens L31 to the image plane IMA3 along the optical axis OA3, $f3_1$ is an effective focal length of the first lens L31, $f3_2$ is an effective focal length of the second lens L32, $f3_3$ is an effective focal length of the third lens L33, and $f3_4$ is an effective focal length of the fourth lens L34.

By the above design of the lenses and stop ST3, the near infrared lens assembly 3 is provided with a shortened total lens length, an increased resolution, and an effective corrected aberration.

In order to achieve the above purposes and effectively enhance the optical performance, the near infrared lens assembly 3 in accordance with the third embodiment of the invention is provided with the optical specifications shown in Table 5, which include the effective focal length, F-number, field of view, total lens length, radius of curvature of each lens surface, thickness between adjacent surface, refractive index of each lens and Abbe number of each lens. Table 5 shows that the effective focal length is equal to 5.150 mm, F-number is equal to 2.2, field of view is equal to 92° and total lens length is equal to 5.4000 mm for the near infrared lens assembly 3 of the third embodiment of the invention.

TABLE 5

Effective Focal Length = 5.150 mm F-number = 2.2
Field of View = 92° Total Lens Length = 5.400 mm

| Surface Number | Radius of Curvature (mm) | Thickness (mm) | Nd | Vd | Remark |
|---|---|---|---|---|---|
| S31 | 2.25158 | 0.871 | 1.535 | 56.1 | The First Lens L31 |
| S32 | −10.00000 | 0.052 | | | |
| S33 | 8.98839 | 0.350 | 1.589 | 61.2 | The Second Lens L32 |
| S34 | 4.89229 | 0.287 | | | |
| S35 | ∞ | 1.251 | | | Stop ST3 |
| S36 | −4.88123 | 0.937 | 1.636 | 23.9 | The Third Lens L33 |
| S37 | −3.69061 | 0.452 | | | |
| S38 | −1.71036 | 0.350 | 1.535 | 56.1 | The Fourth Lens L34 |
| S39 | −7.00000 | 0.100 | | | |
| S310 | ∞ | 0.210 | 1.517 | 64.2 | Optical Filter OF3 |
| S311 | ∞ | 0.540 | | | |

The aspheric surface sag z of each lens in table 5 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the third embodiment, the conic constant k and the aspheric coefficients A, B, C, D, E of each surface are shown in Table 6.

TABLE 6

| Surface Number | k | A | B | C | D | E |
|---|---|---|---|---|---|---|
| S31 | −1.82274E+00 | 1.44808E−03 | −6.93076E−03 | −6.55964E−04 | 2.96323E−04 | 9.52171E−05 |
| S32 | 0.00000E+00 | 4.27625E−03 | 9.07289E−04 | −8.87061E−04 | −1.31743E−04 | 1.79160E−04 |
| S33 | −4.40154E+00 | 2.30637E−02 | 7.83110E−03 | −1.24926E−03 | −2.56011E−03 | −6.45226E−04 |
| S34 | 0.00000E+00 | −7.65724E−03 | −4.29061E−03 | −5.35958E−03 | −4.70532E−03 | 1.27995E−03 |
| S36 | 1.77727E+01 | −6.60891E−02 | −1.48968E−03 | −6.24095E−02 | 6.35314E−02 | −4.56776E−02 |
| S37 | −2.34674E−01 | −1.42162E−02 | −1.04984E−02 | 9.32530E−05 | −3.02484E−03 | 1.09974E−03 |
| S38 | 0.00000E+00 | 6.44145E−02 | −2.13558E−02 | −2.98052E−03 | 1.60975E−03 | 6.24402E−04 |
| S39 | 0.00000E+00 | 1.27414E−02 | −1.94175E−02 | 1.53522E−03 | 6.46555E−04 | −1.11163E−04 |

For the near infrared lens assembly 3 of the third embodiment, the effective focal length f3$_{12}$ of the combination of the first lens L31 and the second lens L32 is equal to 4.1234634 mm, the effective focal length f3$_{34}$ of the combination of the third lens L33 and the fourth lens L34 is equal to −5.347574 mm, the effective focal length f3 of the near infrared lens assembly 3 is equal to 5.150 mm, the distance TTL3 from the object side surface S31 of the first lens L31 to the image plane IMA3 along the optical axis OA3 is equal to 5.400 mm, the effective focal length f3$_1$ of the first lens L31 is equal to 3.573882 mm, the effective focal length f3$_2$ of the second lens L32 is equal to −19.08027 mm, the effective focal length f3$_3$ of the third lens L33 is equal to 18.975071 mm, and the effective focal length f3$_4$ of the fourth lens L34 is equal to −4.393825 mm. According to the above data, the following values can be obtained:

$$f3_{12}/f3=0.8007,$$

$$f3_{34}/f3=-1.0385,$$

$$f3/TTL3=0.9536,$$

$$f3_1/f3=0.6940,$$

$$f3_2/f3=-3\ 0.7052,$$

$$f3_3/f3=3.6848,$$

$$f3_4/f3=-0.8532$$

which respectively satisfy the above conditions (15)-(21).

Figure 6A:
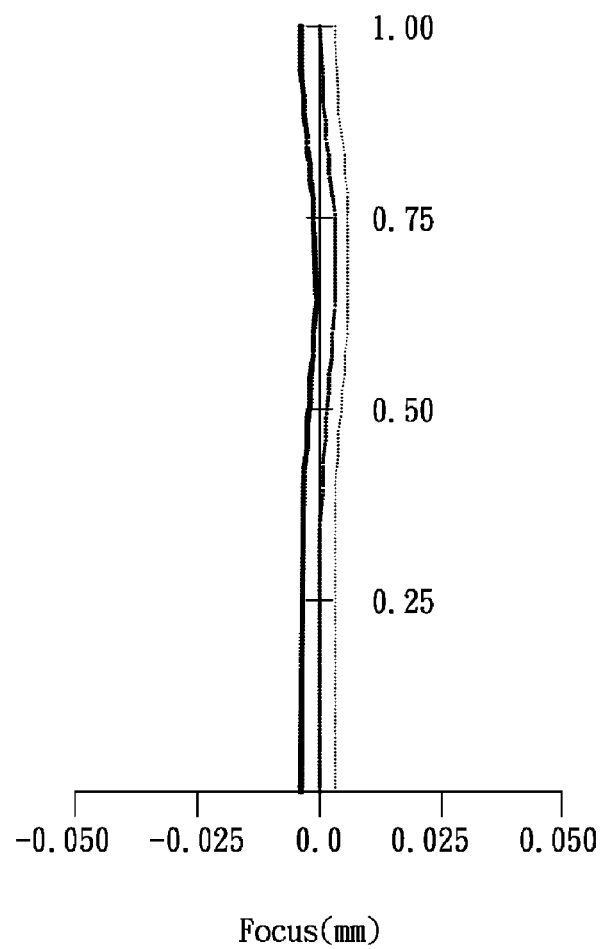
FIG. 6A depicts a longitudinal spherical aberration of the near infrared lens assembly in accordance with the third embodiment of the invention.
Figure 6B:
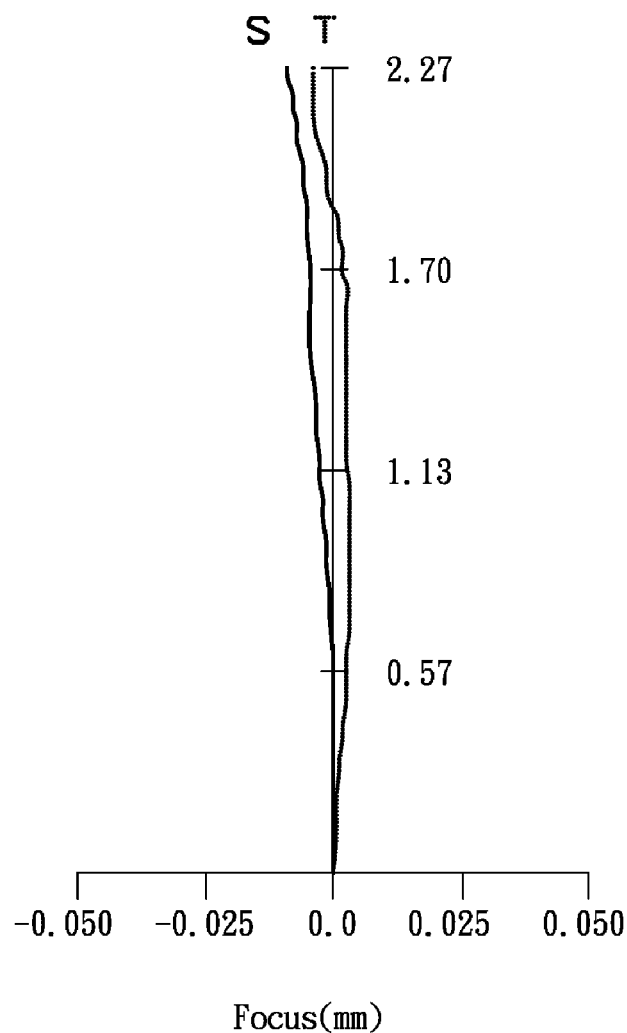
FIG. 6B is an astigmatic field curves diagram of the near infrared lens assembly in accordance with the third embodiment of the invention.
Figure 6C:
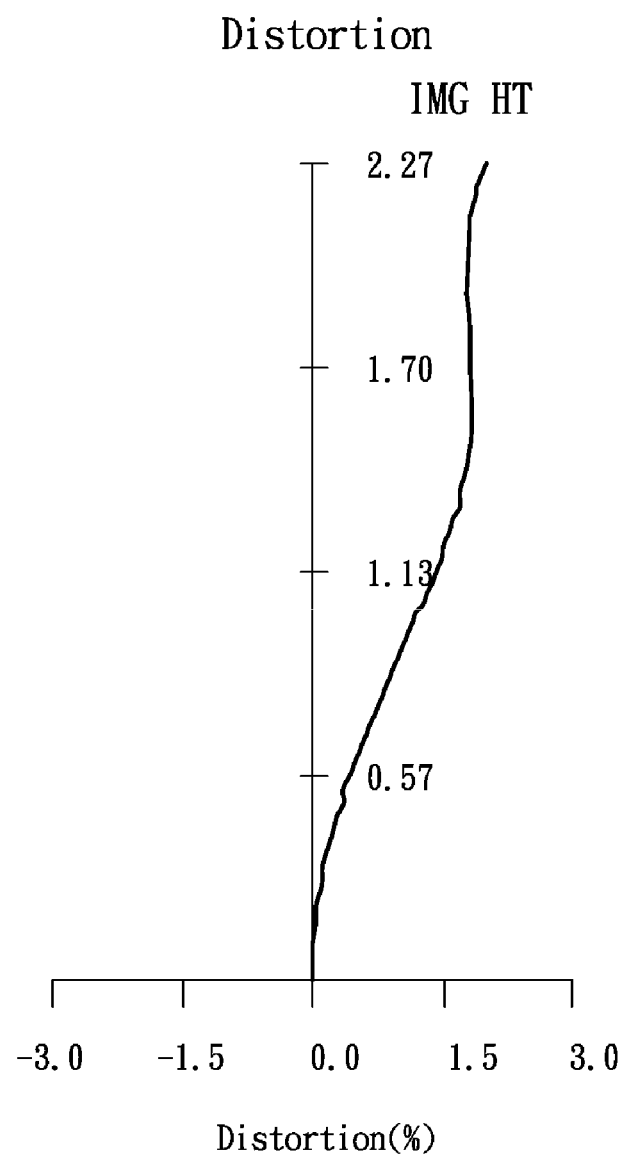
FIG. 6C is a distortion diagram of the near infrared lens assembly in accordance with the third embodiment of the invention.

By the above arrangements of the lenses and stop ST3, the near infrared lens assembly 3 of the third embodiment can meet the requirements of optical performance as seen in FIGS. 6A-6C, wherein FIG. 6A shows a longitudinal spherical aberration diagram of the near infrared lens assembly 3 in accordance with the third embodiment of the invention, FIG. 6B shows an astigmatic field curves of the near infrared lens assembly 3 in accordance with the third embodiment of the invention and FIG. 6C shows a distortion diagram of the near infrared lens assembly 3 in accordance with the third embodiment of the invention.

It can be seen from FIG. 6A that the longitudinal spherical aberration in the near infrared lens assembly 3 of the third embodiment ranges between −0.0125 mm and 0.0125 mm for the wavelength of 800.0000 nm, 850.0000 nm and 900.0000 nm. It can be seen from FIG. 6B that the astigmatic field curves of tangential direction and sagittal direction in the near infrared lens assembly 3 of the third embodiment ranges between −0.025 mm and 0.0125 mm for the wavelength of 850.0000 nm. It can be seen from FIG. 6C that the distortion in the near infrared lens assembly 3 of the third embodiment ranges between 0% and 2.0% for the wavelength of 850.0000 nm. It is obvious that the longitudinal spherical aberration, the astigmatic field curves and the distortion of the near infrared lens assembly 3 of the third embodiment can be corrected effectively. Therefore, the near infrared lens assembly 3 of the third embodiment is capable of good optical performance.

Figure 7:
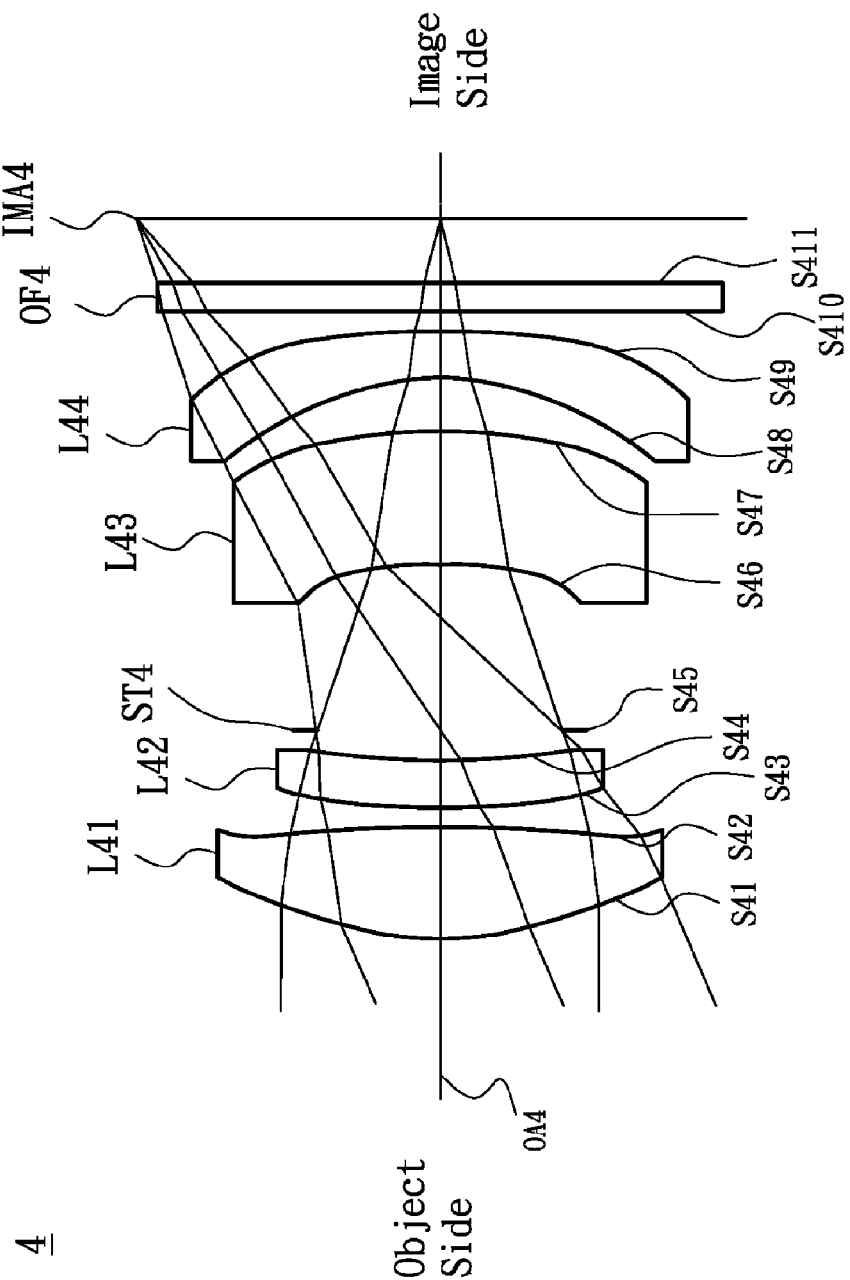
FIG. 7 is a lens layout and optical path diagram of a near infrared lens assembly in accordance with a fourth embodiment of the invention.

Referring to FIG. 7, FIG. 7 is a lens layout and optical path diagram of a near infrared lens assembly in accordance with a fourth embodiment of the invention. The near infrared lens assembly 4 includes a first lens L41, a second lens L42, a stop ST4, a third lens L43, a fourth lens L44 and an Optical filter OF4, all of which are arranged in sequence from an object side to an image side along an optical axis OA4. In operation, an image of light rays from the object side is formed at an image plane IMA4. The first lens L41 is made of plastic material and with positive refractive power, wherein the object side surface S41 is a convex surface, the image side surface S42 is a convex surface and both of the object side surface S41 and image side surface S42 are aspheric surfaces. The second lens L42 is made of plastic material and with negative refractive power, wherein the object side surface S43 is a convex surface, the image side surface S44 is a concave surface and both of the object side surface S43 and image side surface S44 are aspheric surfaces. The third lens L43 is made of plastic material and with positive refractive power, wherein the object side surface S46 is a concave surface, the image side surface S47 is a convex surface and both of the object side surface S46 and image side surface S47 are aspheric surfaces. The fourth lens L44 is made of plastic material and with negative refractive power, wherein the object side surface S48 is a concave surface, the image side surface S49 is a convex surface and both of the object side surface S48 and image side surface S49 are aspheric surfaces. Both of the object side surface S410 and image side surface S411 of the optical filter OF4 are plane surfaces.

In order to maintain excellent optical performance of the near infrared lens assembly in accordance with the fourth embodiment of the invention, the near infrared lens assembly 4 must satisfies the following seven conditions:

$$0.6 \leq f4_{12}/f4 \leq 1 \tag{22}$$

$$-2 \leq f4_{34}/f4 \leq -0.5 \tag{23}$$

$$0.9 \leq f4/TTL4 \leq 1 \tag{24}$$

$$0.5 \leq f4_1/f4 \leq 3 \tag{25}$$

$$-5 \leq f4_2/f4 \leq 2 \tag{26}$$

$$-5 \leq f4_3/f4 \leq 5 \tag{27}$$

$$-2 \leq f4_4/f4 \leq -0.5 \tag{28}$$

wherein f4$_{12}$ is an effective focal length of the combination of the first lens L41 and the second lens L42, f4$_{34}$ is an effective focal length of the combination of the third lens L43 and the fourth lens L44, f4 is an effective focal length of the near infrared lens assembly 4, TTL4 is a distance from the object side surface S41 of the first lens L41 to the image plane IMA4 along the optical axis OA4, f4$_1$ is an effective focal length of the first lens L41, f4$_2$ is an effective focal length of the second lens L42, f4$_3$ is an effective focal length of the third lens L43, and f4$_4$ is an effective focal length of the fourth lens L44.

By the above design of the lenses and stop ST4, the near infrared lens assembly 4 is provided with a shortened total lens length, an increased resolution, and an effective corrected aberration.

In order to achieve the above purposes and effectively enhance the optical performance, the near infrared lens assembly 4 in accordance with the fourth embodiment of the invention is provided with the optical specifications shown in Table 7, which include the effective focal length, F-number, field of view, total lens length, radius of curvature of each lens surface, thickness between adjacent surface, refractive index of each lens and Abbe number of each lens. Table 7 shows that the effective focal length is equal to 5.130 mm, F-number is equal to 2.2, field of view is equal to 92° and total lens length is equal to 5.4000 mm for the near infrared lens assembly 4 of the fourth embodiment of the invention.

TABLE 7

Effective Focal Length = 5.130 mm F-number = 2.2
Field of View = 92° Total Lens Length = 5.400 mm

| Surface Number | Radius of Curvature (mm) | Thickness (mm) | Nd | Vd | Remark |
|---|---|---|---|---|---|
| S41 | 2.39987 | 0.837 | 1.544 | 56.1 | The First Lens L41 |
| S42 | −9.80467 | 0.150 | | | |
| S43 | 9.74834 | 0.350 | 1.582 | 30.2 | The Second Lens L42 |
| S44 | 5.45457 | 0.232 | | | |
| S45 | ∞ | 1.234 | | | Stop ST4 |
| S46 | −6.30719 | 1.001 | 1.544 | 56.1 | The Third Lens L43 |
| S47 | −4.52671 | 0.397 | | | |
| S48 | −1.82312 | 0.350 | 1.544 | 56.1 | The Fourth Lens L44 |
| S49 | −7.00000 | 0.150 | | | |
| S410 | ∞ | 0.210 | 1.517 | 64.2 | Optical Filter OF4 |
| S411 | ∞ | 0.490 | | | |

The aspheric surface sag z of each lens in table 7 can be calculated by the following formula:

$$z = ch^2 / \{1 + [1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the fourth embodiment, the conic constant k and the aspheric coefficients A, B, C, D, E of each surface are shown in Table 8.

TABLE 8

| Surface Number | k | A | B | C | D | E |
|---|---|---|---|---|---|---|
| S41 | −2.26199E+00 | 8.50175E−04 | −5.83519E−03 | −3.36563E−04 | 2.93880E−04 | 1.16937E−04 |
| S42 | 0.00000E+00 | 3.70027E−03 | 2.21037E−03 | −6.82355E−04 | −1.65613E−04 | 2.79955E−04 |
| S43 | 3.57167E+01 | 2.79250E−02 | 6.75121E−03 | −2.09445E−03 | −2.79056E−03 | −3.35083E−04 |
| S44 | 0.00000E+00 | −3.89688E−04 | −4.59775E−03 | −6.36367E−03 | −4.72231E−03 | 1.61195E−03 |
| S46 | 3.02622E+01 | −6.68100E−02 | −1.35773E−02 | −5.00447E−02 | 5.40836E−02 | −4.49342E−02 |
| S47 | −1.64817E+00 | 5.83760E−03 | −1.03933E−02 | −1.63290E−04 | −2.85465E−03 | 1.09718E−03 |
| S48 | 0.00000E+00 | 8.07492E−02 | −2.00013E−02 | −1.72325E−03 | 1.12861E−03 | 3.12231E−04 |
| S49 | 0.00000E+00 | 1.44460E−02 | −1.78127E−02 | 1.02944E−03 | 6.85015E−04 | −1.11849E−04 |

For the near infrared lens assembly 4 of the fourth embodiment, the effective focal length $f4_{12}$ of the combination of the first lens L41 and the second lens L42 is equal to 4.1588711 mm, the effective focal length $f4_{34}$ of the combination of the third lens L43 and the fourth lens L44 is equal to −5.511109 mm, the effective focal length f4 of the near infrared lens assembly 4 is equal to 5.130 mm, the distance TTL4 from the object side surface S41 of the first lens L41 to the image plane IMA4 along the optical axis OA4 is equal to 5.400 mm, the effective focal length $f4_1$ of the first lens L41 is equal to 3.684161 mm, the effective focal length $f4_2$ of the second lens L42 is equal to −22.45904 mm, the effective focal length $f4_3$ of the third lens L43 is equal to 25.003466 mm, and the effective focal length $f4_4$ of the fourth lens L44 is equal to −4.709051 mm. According to the above data, the following values can be obtained:

$f4_{12}/f4 = 0.8106$, $f4_{34}/f4 = −1.0742$, $f4/TTL4 = 0.9501$, $f4_1/f4 = 0.7181$, $f4_2/f4 = −4.3776$, $f4_3/f4 = 4.8736$, $f4_4/f4 = −0.9179$ which respectively satisfy the above conditions (22)-(28).

Figure 8A:
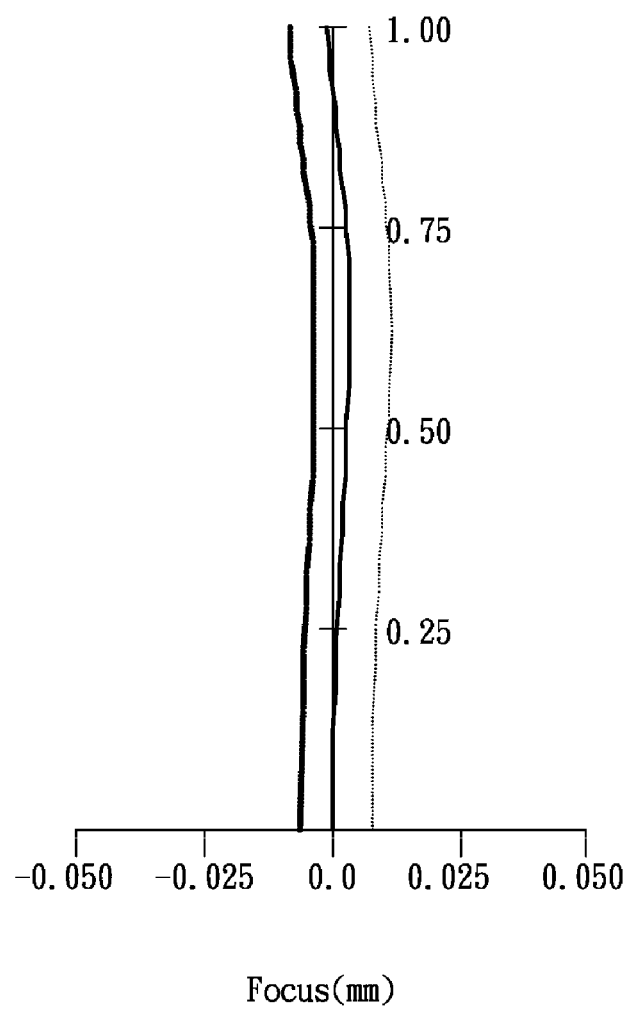
FIG. 8A depicts a longitudinal spherical aberration of the near infrared lens assembly in accordance with the fourth embodiment of the invention.
Figure 8B:
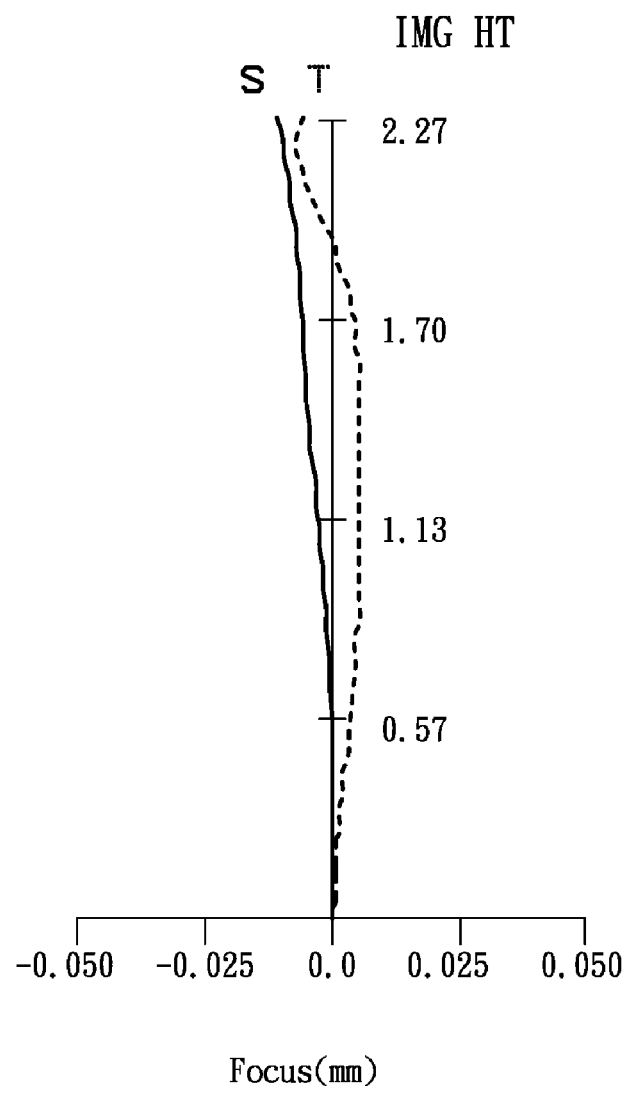
FIG. 8B is an astigmatic field curves diagram of the near infrared lens assembly in accordance with the fourth embodiment of the invention.
Figure 8C:
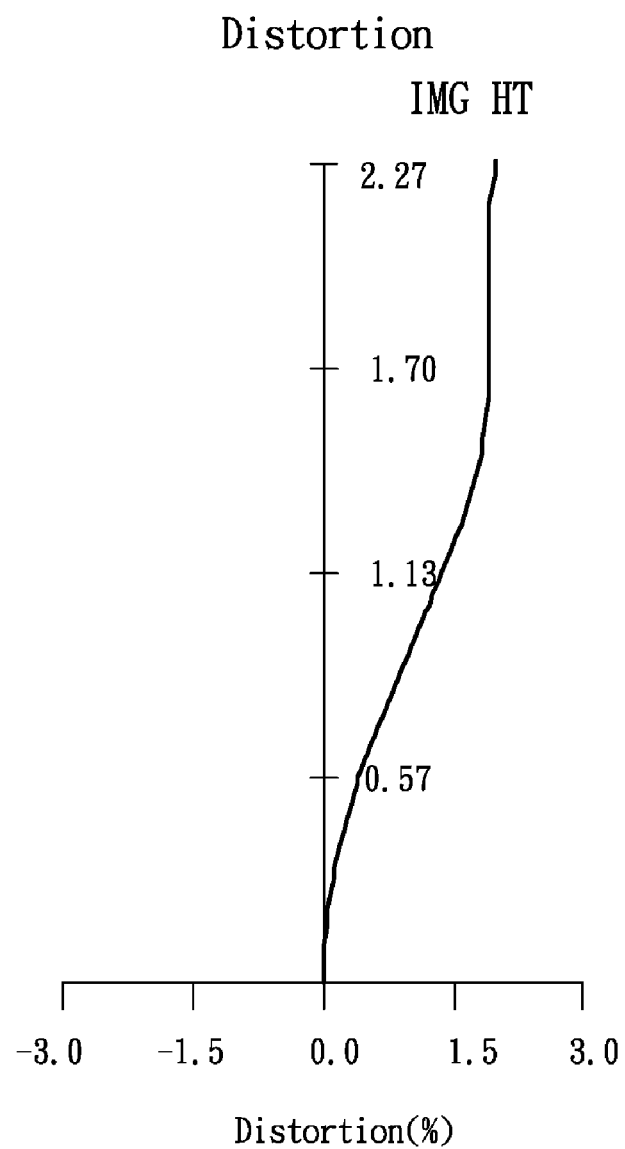
FIG. 8C is a distortion diagram of the near infrared lens assembly in accordance with the fourth embodiment of the invention.

By the above arrangements of the lenses and stop ST4, the near infrared lens assembly 4 of the fourth embodiment can meet the requirements of optical performance as seen in FIGS. 8A-8C, wherein FIG. 8A shows a longitudinal spherical aberration diagram of the near infrared lens assembly 4 in accordance with the fourth embodiment of the invention, FIG. 8B shows an astigmatic field curves of the near infrared lens assembly 4 in accordance with the fourth embodiment of the invention and FIG. 8C shows a distortion diagram of the near infrared lens assembly 4 in accordance with the fourth embodiment of the invention.

It can be seen from FIG. 8A that the longitudinal spherical aberration in the near infrared lens assembly 4 of the fourth embodiment ranges between −0.025 mm and 0.025 mm for the wavelength of 800.0000 nm, 850.0000 nm and 900.0000 nm. It can be seen from FIG. 8B that the astigmatic field curves of tangential direction and sagittal direction in the near infrared lens assembly 4 of the fourth embodiment ranges between −0.025 mm and 0.0125 mm for the wavelength of 850.0000 nm. It can be seen from FIG. 8C that the distortion in the near infrared lens assembly 4 of the fourth embodiment ranges between 0% and 2.0% for the wavelength of 850.0000 nm. It is obvious that the longitudinal spherical aberration, the astigmatic field curves and the distortion of the near infrared lens assembly 4 of the fourth embodiment can be corrected effectively. Therefore, the near infrared lens assembly 4 of the fourth embodiment is capable of good optical performance.

Figure 9:
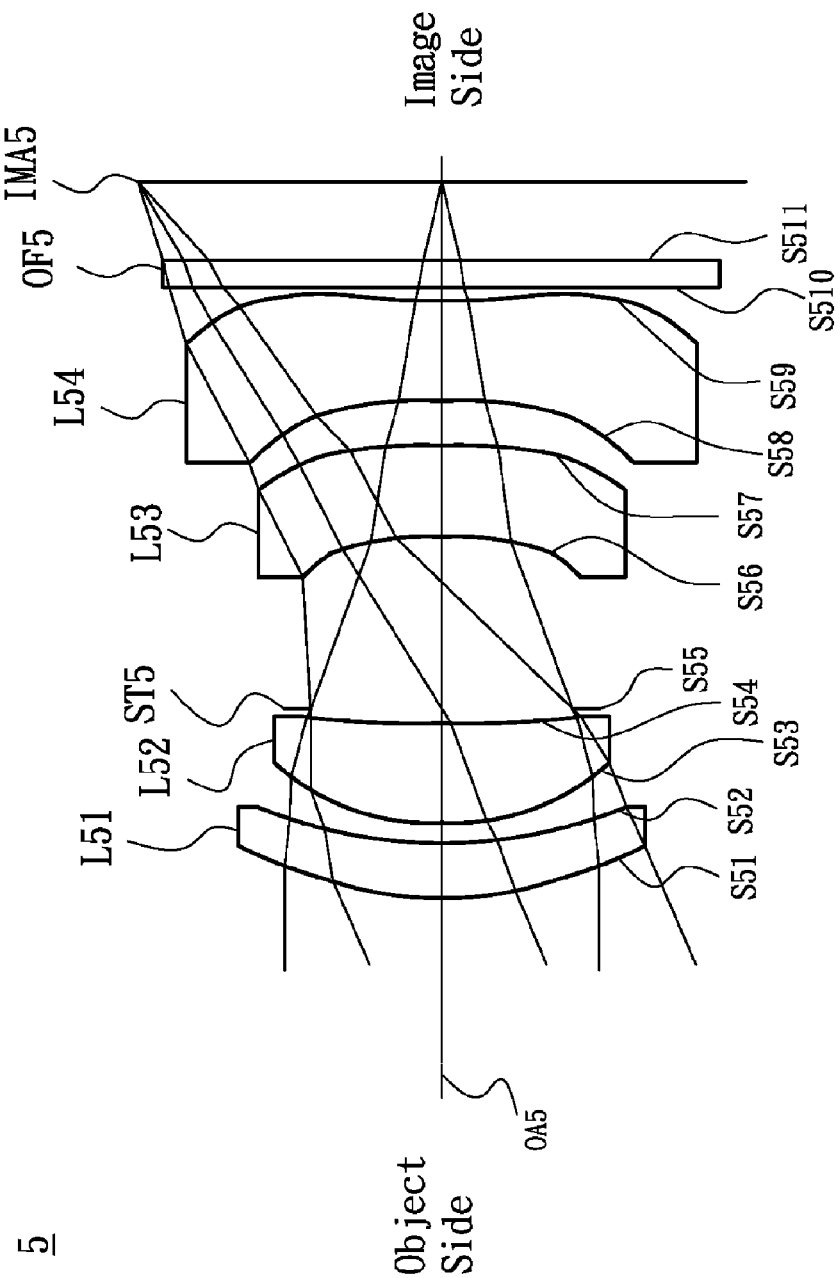
FIG. 9 is a lens layout and optical path diagram of a near infrared lens assembly in accordance with a fifth embodiment of the invention.

Referring to FIG. 9, FIG. 9 is a lens layout and optical path diagram of a near infrared lens assembly in accordance with a fifth embodiment of the invention. The near infrared lens assembly 5 includes a first lens L51, a second lens L52, a stop ST5, a third lens L53, a fourth lens L54 and an Optical filter OF5, all of which are arranged in sequence from an object side to an image side along an optical axis OA5. In operation, an image of light rays from the object side is formed at an image plane IMA5. The first lens L51 is made of plastic material and with positive refractive power, wherein the object side surface S51 is a convex surface, the image side surface S52 is a concave surface and both of the object side surface S51 and image side surface S52 are aspheric surfaces. The second lens L52 is made of plastic material and with positive refractive power, wherein the object side surface S53 is a convex surface, the image side surface S54 is a concave surface and both of the object side surface S53 and image side surface S54 are aspheric surfaces. The third lens L53 is made of plastic material and with negative refractive power, wherein the object side surface S56 is a concave surface, the image side surface S57 is a convex surface and both of the object side surface S56 and image side surface S57 are aspheric surfaces. The fourth lens L54 is made of plastic material and with negative refractive power, wherein the object side surface S58 is a concave surface, the image side surface S59 is a concave surface and both of the object side surface S58 and image side surface S59 are aspheric surfaces. Both of the object side surface S510 and image side surface S511 of the optical filter OF5 are plane surfaces.

In order to maintain excellent optical performance of the near infrared lens assembly in accordance with the fifth embodiment of the invention, the near infrared lens assembly 5 must satisfies the following seven conditions:

$$0.6 \leq f5_{12}/f5 \leq 1 \tag{29}$$

$$-2 \leq f5_{34}/f5 \leq -0.5 \tag{30}$$

$$0.9 \leq f5/TTL5 \leq 1 \tag{31}$$

$$0.5 \leq f5_1/f5 \leq 3 \tag{32}$$

$$-5 \leq f5_2/f5 \leq 2 \tag{33}$$

$$-5 \leq f5_3/f5 \leq 5 \tag{34}$$

$$-2 \leq f5_4/f5 \leq -0.5 \tag{35}$$

wherein $f5_{12}$ is an effective focal length of the combination of the first lens L51 and the second lens L52, $f5_{34}$ is an effective focal length of the combination of the third lens L53 and the fourth lens L54, f5 is an effective focal length of the near infrared lens assembly 5, TTL5 is a distance from the object side surface S51 of the first lens L51 to the image plane IMA5 along the optical axis OA5, $f5_1$ is an effective focal length of the first lens L51, $f5_2$ is an effective focal length of the second lens L52, $f5_3$ is an effective focal length of the third lens L53, and $f5_4$ is an effective focal length of the fourth lens L54.

refractive index of each lens and Abbe number of each lens. Table 9 shows that the effective focal length is equal to 5.098 mm, F-number is equal to 2.2, field of view is equal to 94° and total lens length is equal to 5.4000 mm for the near infrared lens assembly 5 of the fifth embodiment of the invention.

TABLE 9

Effective Focal Length = 5.098 mm F-number = 2.2
Field of View = 94° Total Lens Length = 5.400 mm

| Surface Number | Radius of Curvature (mm) | Thickness (mm) | Nd | Vd | Remark |
|---|---|---|---|---|---|
| S51 | 2.43554 | 0.419 | 1.535 | 56.1 | The First Lens L51 |
| S52 | 3.95324 | 0.151 | | | |
| S53 | 2.48878 | 0.748 | 1.535 | 56.1 | The Second Lens L52 |
| S54 | 13.67312 | 0.109 | | | |
| S55 | ∞ | 1.295 | | | Stop ST5 |
| S56 | −5.07932 | 0.685 | 1.636 | 23.9 | The Third Lens L53 |
| S57 | −9.10989 | 0.343 | | | |
| S58 | −10.00000 | 0.751 | 1.535 | 56.1 | The Fourth Lens L54 |
| S59 | 4.37167 | 0.100 | | | |
| S510 | ∞ | 0.210 | 1.517 | 64.2 | Optical Filter OF5 |
| S511 | ∞ | 0.589 | | | |

The aspheric surface sag z of each lens in table 9 can be calculated by the following formula:

$$z = ch^2/\{1+[1-(k+1)c^2h^2]^{1/2}\}+Ah^4+Bh^6+Ch^8+Dh^{10}+Eh^{12}$$

where c is curvature, h is the vertical distance from the lens surface to the optical axis, k is conic constant and A, B, C, D and E are aspheric coefficients.

In the fifth embodiment, the conic constant k and the aspheric coefficients A, B, C, D, E of each surface are shown in Table 10.

TABLE 10

| Surface Number | k | A | B | C | D | E |
|---|---|---|---|---|---|---|
| S51 | −2.27813E+00 | −1.90187E−03 | −4.92307E−03 | 6.61652E−04 | 3.86792E−04 | −3.62263E−05 |
| S52 | 0.00000E+00 | 2.76139E−03 | 2.05882E−03 | −8.01541E−04 | −1.49895E−05 | 2.37760E−04 |
| S53 | 1.99587E+00 | 1.82410E−02 | 3.03670E−03 | −1.21116E−03 | −1.78317E−03 | 3.17281E−04 |
| S54 | 0.00000E+00 | 5.51339E−03 | 1.92924E−03 | −1.14931E−03 | −4.00069E−05 | 1.15572E−03 |
| S56 | 2.05658E+01 | −5.17541E−02 | −4.76376E−02 | −2.07237E−02 | 4.54269E−02 | −4.04253E−02 |
| S57 | −1.97420E+02 | −5.34501E−02 | −2.44996E−02 | 8.71643E−03 | −7.17447E−04 | −2.99506E−04 |
| S58 | 0.00000E+00 | −8.11005E−02 | −1.83385E−02 | 5.88680E−03 | 3.33720E−03 | −1.19705E−03 |
| S59 | 0.00000E+00 | −7.29852E−02 | 5.69264E−03 | −3.14163E−04 | 2.44243E−05 | −1.40234E−05 |

By the above design of the lenses and stop ST5, the near infrared lens assembly 5 is provided with a shortened total lens length, an increased resolution, and an effective corrected aberration.

In order to achieve the above purposes and effectively enhance the optical performance, the near infrared lens assembly 5 in accordance with the fifth embodiment of the invention is provided with the optical specifications shown in Table 9, which include the effective focal length, F-number, field of view, total lens length, radius of curvature of each lens surface, thickness between adjacent surface, For the near infrared lens assembly 5 of the fifth embodiment, the effective focal length $f5_{12}$ of the combination of the first lens L51 and the second lens L52 is equal to 3.8906446 mm, the effective focal length $f5_{34}$ of the combination of the third lens L53 and the fourth lens L54 is equal to −4.141311 mm, the effective focal length f5 of the near infrared lens assembly 5 is equal to 5.098 mm, the distance TTL5 from the object side surface S51 of the first lens L51 to the image plane IMA5 along the optical axis OA5 is equal to 5.400 mm, the effective focal length $f5_1$ of the first lens L51 is equal to 10.986343 mm, the effective focal length $f5_2$ of the second lens L52 is equal to 5.641353 mm, the effective focal length f5$_3$ of the third lens L53 is equal to −19.99995 mm, and the effective focal length f5$_4$ of the fourth lens L54 is equal to −5.667977 mm. According to the above data, the following values can be obtained:

$$f5_{12}/f5=0.7631,$$

$$f5_{34}/f5=-0.8123,$$

$$f5/TTL5=0.9441,$$

$$f5_1/f5=2.1549,$$

$$f5_2/f5=1.1065,$$

$$f5_3/f5=-3.9228,$$

$$f5_4/f5=-1.1117$$

which respectively satisfy the above conditions (29)-(35).

Figure 10A:
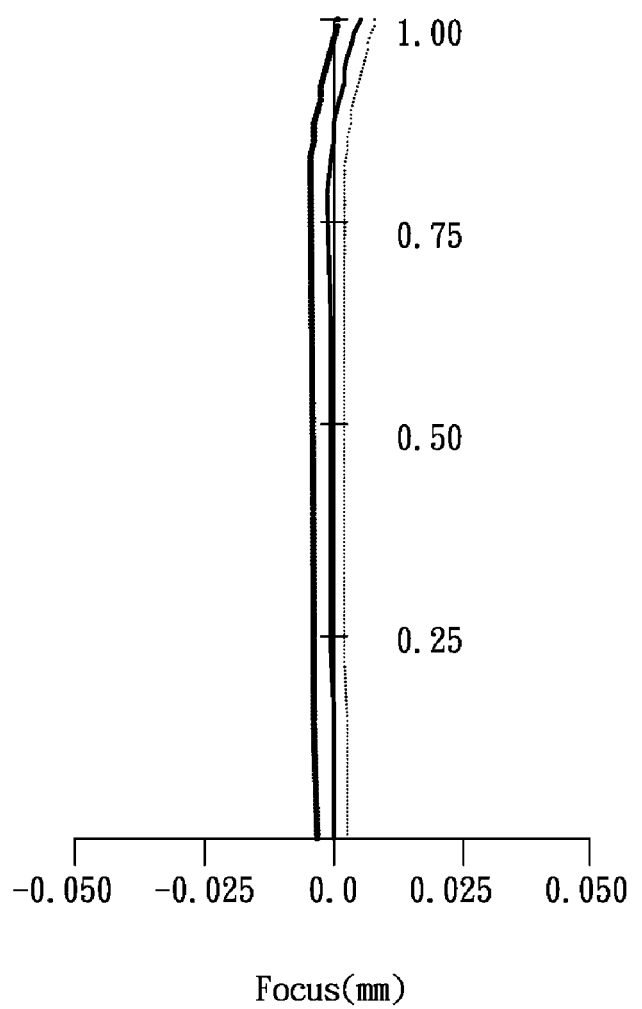
FIG. 10A depicts a longitudinal spherical aberration of the near infrared lens assembly in accordance with the fifth embodiment of the invention.
Figure 10B:
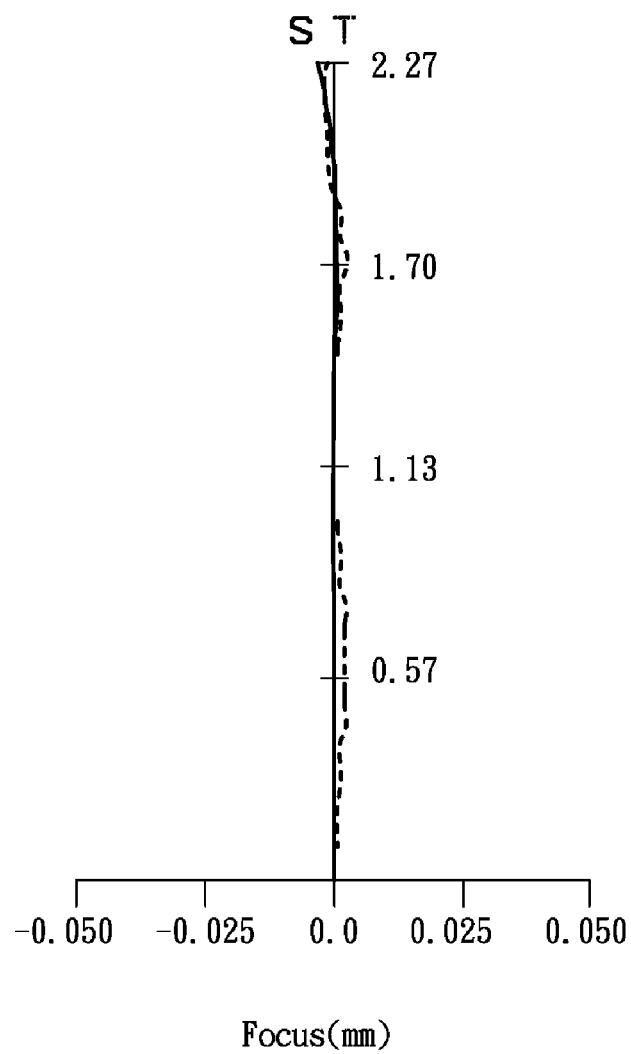
FIG. 10B is an astigmatic field curves diagram of the near infrared lens assembly in accordance with the fifth embodiment of the invention.
Figure 10C:
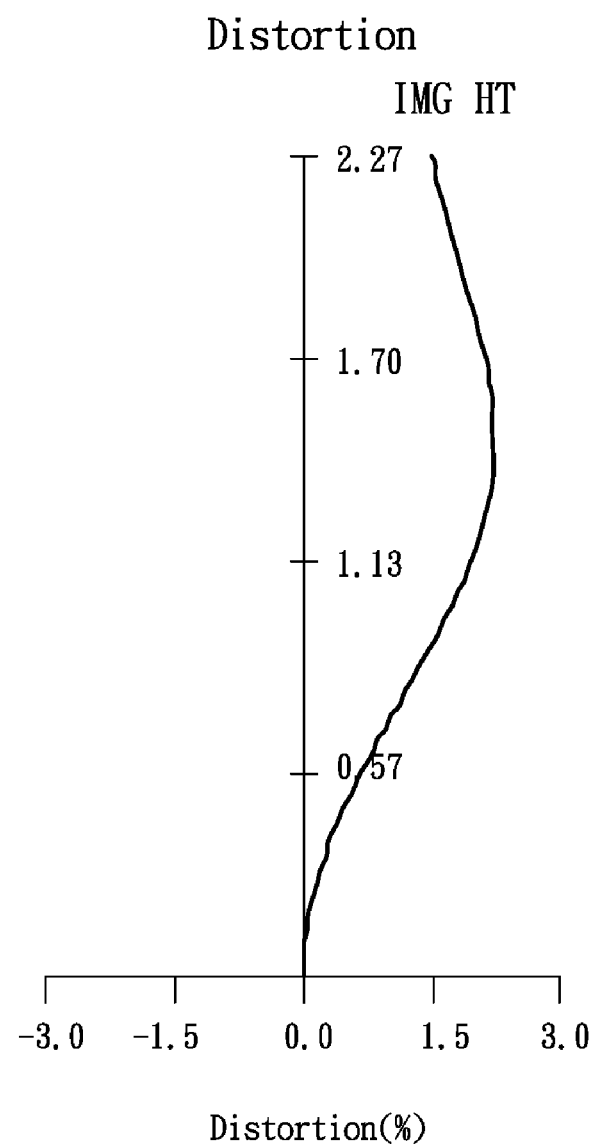
FIG. 10C is a distortion diagram of the near infrared lens assembly in accordance with the fifth embodiment of the invention.

By the above arrangements of the lenses and stop ST5, the near infrared lens assembly 5 of the fifth embodiment can meet the requirements of optical performance as seen in FIGS. 10A-10C, wherein FIG. 10A shows a longitudinal spherical aberration diagram of the near infrared lens assembly 5 in accordance with the fifth embodiment of the invention, FIG. 10B shows an astigmatic field curves of the near infrared lens assembly 5 in accordance with the fifth embodiment of the invention and FIG. 10C shows a distortion diagram of the near infrared lens assembly 5 in accordance with the fifth embodiment of the invention.

It can be seen from FIG. 10A that the longitudinal spherical aberration in the near infrared lens assembly 5 of the fifth embodiment ranges between −0.0125 mm and 0.025 mm for the wavelength of 800.0000 nm, 850.0000 nm and 900.0000 nm. It can be seen from FIG. 10B that the astigmatic field curves of tangential direction and sagittal direction in the near infrared lens assembly 5 of the fifth embodiment ranges between −0.0125 mm and 0.0125 mm for the wavelength of 850.0000 nm. It can be seen from FIG. 10C that the distortion in the near infrared lens assembly 5 of the fifth embodiment ranges between 0% and 2.3% for the wavelength of 850.0000 nm. It is obvious that the longitudinal spherical aberration, the astigmatic field curves and the distortion of the near infrared lens assembly 5 of the fifth embodiment can be corrected effectively. Therefore, the near infrared lens assembly 5 of the fifth embodiment is capable of good optical performance.

In the above embodiments, all the object side surfaces and image side surfaces of the first, second, third and fourth lens are aspheric surfaces. However, it has the same effect and falls into the scope of the invention that any of the object side surfaces and image side surfaces of the first, second, third and fourth lens are changed into spherical surfaces.

In the above embodiments, all the first, second, third and fourth lens are made of plastic material. However, it has the same effect and falls into the scope of the invention that all of or part of the first, second, third and fourth lens are made of glass material.

What is claimed is:

1. A near infrared lens assembly comprising a first lens, a second lens, a third lens and a fourth lens, all of which are arranged in sequence from an object side to an image side along an optical axis, wherein:

the first lens is with positive refractive power and comprises a convex surface facing the object side;

the second lens is a meniscus lens with positive refractive power and comprises a convex surface facing the object side and a concave surface facing the image side;

the third lens is a meniscus lens and comprises a concave surface facing the object side and a convex surface facing the image side;

the fourth lens is with negative refractive power and comprises a concave surface facing the object side and a concave surface facing the image side;

a combination of the third lens and the fourth lens is with negative refractive power; and the near infrared lens assembly satisfies:

$$-5 \leq f_3/f \leq 5,$$

wherein $f_3$ is an effective focal length of the third lens and f is an effective focal length of the near infrared lens assembly.

2. The near infrared lens assembly as claimed in claim 1, wherein the first lens is a meniscus lens and further comprises a concave surface facing the image side.

3. The near infrared lens assembly as claimed in claim 1, wherein the first lens is a biconvex lens.

4. The near infrared lens assembly as claimed in claim 1, wherein the third lens is with positive refractive power.

5. The near infrared lens assembly as claimed in claim 1, wherein the third lens is with negative refractive power.

6. The near infrared lens assembly as claimed in claim 1, wherein a combination of the first lens and the second lens is with positive refractive power and the near infrared lens assembly satisfies: $0.9 \leq f/TTL \leq 1$, wherein f is an effective focal length of the near infrared lens assembly and TTL is a distance from the convex surface of the first lens to an image plane along the optical axis.

7. The near infrared lens assembly as claimed in claim 1, wherein the first lens and the second lens satisfy:

$$0.6 \leq f_{12}/f \leq 1,$$

wherein $f_{12}$ is an effective focal length of a combination of the first lens and the second lens, and f is an effective focal length of the near infrared lens assembly.

8. The near infrared lens assembly as claimed in claim 1, wherein the third lens and the fourth lens satisfy:

$$-2 \leq f_{34}/f \leq -0.5,$$

wherein $f_{34}$ is an effective focal length of a combination of the third lens and the fourth lens, and f is an effective focal length of the near infrared lens assembly.

9. The near infrared lens assembly as claimed in claim 1, wherein the near infrared lens assembly satisfies:

$$0.9 \leq f/TTL \leq 1,$$

wherein f is an effective focal length of the near infrared lens assembly and TTL is a distance from the convex surface of the first lens to an image plane along the optical axis.

10. The near infrared lens assembly as claimed in claim 1, wherein the first lens, the second lens, the third lens and the fourth lens satisfy:

$$0.5 \leq f_1/f \leq 3,$$

$$-5 \leq f_2/f \leq 2,$$

$$-2 \leq f_4/f \leq -0.5,$$

wherein $f_1$ is an effective focal length of the first lens, $f_2$ is an effective focal length of the second lens, $f_4$ is an effective focal length of the fourth lens and f is an effective focal length of the near infrared lens assembly.

11. The near infrared lens assembly as claimed in claim 1, wherein the first lens further comprises a surface, wherein the surface is an aspheric surface, or the convex surface of the first lens is an aspheric surface, or both of the surface and the convex surface of the first lens are aspheric surfaces.

12. The near infrared lens assembly as claimed in claim 1, wherein the convex surface of the second lens is an aspheric surface, or the concave surface of the second lens is an aspheric surface, or both of the convex surface and the concave surface of the second lens are aspheric surfaces.

13. The near infrared lens assembly as claimed in claim 1, wherein the concave surface of the third lens is an aspheric surface, or the convex surface of the third lens is an aspheric surface, or both of the concave surface and the convex surface of the third lens are aspheric surfaces.

14. The near infrared lens assembly as claimed in claim 1, wherein the fourth lens further comprises a surface, wherein the surface is an aspheric surface, or the concave surface of the fourth lens is an aspheric surface, or both of the surface and the concave surface of the fourth lens are aspheric surfaces.

15. The near infrared lens assembly as claimed in claim 1, further comprising a stop disposed between the second lens and the third lens.

16. A near infrared lens assembly comprising a first lens, a second lens, a third lens and a fourth lens, all of which are arranged in sequence from an object side to an image side along an optical axis, wherein:

the first lens is with positive refractive power;

the second lens is a meniscus lens with positive refractive power and comprises a convex surface facing the object side and a concave surface facing the image side;

the third lens is a meniscus lens and comprises a concave surface facing the object side and a convex surface facing the image side;

the fourth lens is with negative refractive power and comprises a concave surface facing the image side;

a combination of the third lens and the fourth lens is with negative refractive power; and the near infrared lens assembly satisfies:

$0.5 \leq f_1/f \leq 3,$ $-5 \leq f_2/f \leq 2,$ $-5 \leq f_3/f \leq 5,$ $-2 \leq f_4/f \leq -0.5,$ wherein $f_1$ is an effective focal length of the first lens, $f_2$ is an effective focal length of the second lens, $f_3$ is an effective focal length of the third lens, $f_4$ is an effective focal length of the fourth lens and f is an effective focal length of the near infrared lens assembly.

* * * * *